(12) United States Patent
Villeneuve et al.

(10) Patent No.: US 8,474,826 B2
(45) Date of Patent: Jul. 2, 2013

(54) HYDRODYNAMIC MAGNETIC SEAL

(75) Inventors: Michel Laurent Villeneuve, Vielle Eglise (FR); Xiaoqing Zheng, East Greenwich, RI (US)

(73) Assignee: Eaton Corporation, Cleveland, OH (US)

( * ) Notice: Subject to any disclaimer, the term of this patent is extended or adjusted under 35 U.S.C. 154(b) by 1305 days.

(21) Appl. No.: 11/118,030

(22) Filed: Apr. 29, 2005

(65) Prior Publication Data
US 2006/0244221 A1 Nov. 2, 2006

(51) Int. Cl.
*F16J 15/34* (2006.01)
(52) U.S. Cl.
USPC .................................. 277/377; 277/378
(58) Field of Classification Search
USPC ................................. 277/378, 377
See application file for complete search history.

(56) References Cited

U.S. PATENT DOCUMENTS

| | | | | |
|---|---|---|---|---|
| 2,843,403 | A | * | 7/1958 | Stevenson ..................... 277/378 |
| 3,499,653 | A | | 3/1970 | Gardner |
| 3,708,177 | A | * | 1/1973 | Baermann ..................... 277/378 |
| 4,486,026 | A | * | 12/1984 | Furumura et al. ............. 277/400 |
| 4,795,168 | A | * | 1/1989 | Adams et al. .................. 277/378 |
| 4,908,081 | A | * | 3/1990 | Heinrich et al. ............ 156/89.25 |
| 5,078,411 | A | | 1/1992 | Geco |
| 5,375,853 | A | | 12/1994 | Wasser et al. |
| 5,577,739 | A | | 11/1996 | Ciotola |
| 5,730,447 | A | | 3/1998 | Dawson et al. |
| 5,941,532 | A | | 8/1999 | Flaherty et al. |
| 6,257,859 | B1 | | 7/2001 | Koda et al. |
| 6,446,976 | B1 | * | 9/2002 | Key et al. ....................... 277/367 |
| 6,805,358 | B2 | | 10/2004 | Dawson et al. |

\* cited by examiner

*Primary Examiner* — Vishal Patel
(74) *Attorney, Agent, or Firm* — Dykema Gossett PLLC (57) ABSTRACT

A hydrodynamic magnetic seal includes a magnetic mating ring and a sealing ring attracted to the magnetic mating ring. The magnetic mating ring and/or the sealing ring include hydrodynamic grooves configured to create a separation film between the magnetic mating ring and the sealing ring to reduce friction.

35 Claims, 9 Drawing Sheets

HYDRODYNAMIC MAGNETIC SEAL

FIELD OF THE INVENTION

This invention relates to an improved magnetic seal, and more particularly to a magnetic seal including hydrodynamic grooves useful in rotating machinery such as turbines and in other applications.

BACKGROUND OF THE INVENTION

Mechanical face seals are widely used to provide a seal between a stationary housing, often containing a lubricant such as oil, and a rotating shaft which passes through the housing. Typically, such seals include a stationary sealing ring about the shaft but fixed to the housing. Another sealing ring is mounted on and rotates with the rotating shaft. The seal face of the rotating sealing ring or the stationary sealing ring may include grooves of some type. These grooves form a layer of air between the sealing ring faces during operation. In these "hydrodynamic" seals, the sealing faces of both sealing rings are biased together by mechanical means that may include a spring.

In a magnetic face seal, in contrast, the stationary sealing ring is magnetic and attracts the rotating sealing ring. Thus, mechanical means to bias together the sealing faces can be eliminated. There are no hydrodynamic grooves in a magnetic face seal. Instead, the rotating sealing ring includes a carbon element and the seal face of the magnetic sealing ring rubs against the carbon element.

While magnetic face seals provide the advantage of utilizing magnetic forces to bias the sealing ring faces together, magnetic seals suffer from a number of disadvantages. For example, during operation the sealing faces contact each other, causing friction and generating heat. Consequently, the rings wear. The carbon element reduces but does not eliminate friction. Also, the carbon element can blister, causing further friction and heating. Thus, the effectiveness of the seal is decreased. Moreover, in the example where oil is the liquid to be sealed, the heat generated by the face seal can degrade the oil and result in a buildup of grime or "coking". In each of these cases, the effectiveness of the seal is reduced, and in the worst case, catastrophic failure of the magnetic seal may occur.

SUMMARY OF THE INVENTION

It is therefore an object of this invention to provide an improved magnetic seal.

It is a further object of this invention to provide a lower friction magnetic seal.

It is a further object of this invention to provide such an improved magnetic seal which reduces heat generation.

It is a further object of this invention to provide such an improved magnetic seal with an increased useful life.

In one example, the invention results from the realization that if the stationary magnetic sealing or "mating" ring includes hydrodynamic grooves to produce a thin separation film between the stationary magnetic mating ring and the rotating sealing ring, friction, heat, and wear of the magnetic seal are all reduced.

The subject invention, however, in other embodiments, need not achieve all these objectives and the claims hereof should not be limited to structures or methods capable of achieving these objectives.

This invention features a hydrodynamic magnetic seal including a magnetic mating ring and a sealing ring attracted to the magnetic mating ring. The magnetic mating ring and/or the sealing ring include hydrodynamic grooves configured to create a separation film between the magnetic mating ring and the sealing ring to reduce friction. Preferably, the magnetic mating ring is stationary and the sealing ring rotates. Typically, the magnetic mating ring includes an annular sealing face and the hydrodynamic grooves are in the sealing face. The hydrodynamic grooves are configured to pump gas between sealing faces of the magnetic mating ring and the sealing ring, and the separation film may be between 50 to 200 millionths of an inch thick.

The hydrodynamic magnetic seal may include an insulator about the magnetic mating ring which may be made of aluminum alloy. The hydrodynamic magnetic seal may include an O-ring disposed between the insulator and the magnetic mating ring. The sealing ring may be made of stainless steel of a type attracted by a magnet, and the magnetic mating ring may be made of alnico-5 magnetic material. The sealing ring may include a low friction component defining a sealing face thereof which may be made of carbon, graphite, or a combination of carbon and graphite. The hydrodynamic magnetic seal may include an O-ring housed by the sealing ring. The hydrodynamic grooves may have a depth in the range between 0.00010 inches and 0.00050 inches, a spiral radius in the range between 0.50 inches and 1.000 inches, and a radial width in the range between 0.050 inches and 0.150 inches. The hydrodynamic grooves may have a land to groove ratio in the range between 0.65 and 1.00.

This invention also features a hydrodynamic magnetic seal including a stationary magnetic ring including an annular sealing face and a rotary sealing ring also including an annular sealing face attracted to the magnetic mating ring. The sealing face of the stationary magnetic ring includes hydrodynamic grooves configured to pump gas between the two sealing faces and create a separation film therebetween to reduce friction. The film may be between 50 to 200 millionths of an inch thick. The hydrodynamic magnetic seal may include an insulator about the stationary magnetic ring and the insulator may be made of aluminum alloy. The hydrodynamic magnetic seal may include an O-ring disposed between the insulator and the stationary magnetic ring. The rotary sealing ring may be made of stainless steel of a type attracted by a magnet, and the magnetic mating ring may be made of alnico-5 magnetic material. The rotary sealing ring may include a low friction component defining a sealing face thereof and the low friction component may be made of carbon, graphite, or a combination of carbon and graphite. The hydrodynamic magnetic seal may include an O-ring housed by the rotary sealing ring. The hydrodynamic grooves may have a depth in the range between 0.00010 inches and 0.00050 inches, a spiral radius in the range between 0.50 inches and 1.00 inches, and a radial width in the range between 0.050 inches and 0.15 inches. The hydrodynamic grooves may have a land to groove ratio in the range between 0.65 and 1.00.

This invention further features a hydrodynamic magnetic seal including a stationary magnetic mating ring fixed within a stationary insulator and a rotary sealing ring fixed to a rotating shaft proximate the stationary magnetic mating ring and attracted to the magnetic mating ring. The rotary sealing ring includes a carbon component. The magnetic mating ring and/or the sealing ring include hydrodynamic grooves configured to create a separation film therebetween to reduce friction.

This invention also features a hydrodynamic magnetic seal including a stationary magnetic mating ring including an annular sealing face, an insulator about the stationary magnetic mating ring, and a rotary sealing ring attracted to the magnetic mating ring. The rotary sealing ring has an annular sealing face including a carbon element. The annular sealing face of the magnetic mating ring and/or the rotating sealing ring includes hydrodynamic grooves configured to pump a gas between the sealing faces and create a separation film therebetween to reduce friction.

This invention further features a magnetic face seal system including a housing, a shaft rotatably disposed in the housing, and a magnetic mating ring disposed about the shaft residing in an insulator fixed to the housing. The magnetic mating ring includes an annular sealing face with hydrodynamic grooves therein, and a low friction element residing in a seal case affixed to the shaft proximate the magnetic mating ring.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Industrial seals, particularly mechanical end face seals, have been developed for a variety of industries and for a number of devices such as gas turbines, gearboxes, engines, pumps, and the like. Generally, mechanical face seals seal the space between a housing and a rotating shaft which passes through the housing. As discussed in the Background section above, such seals typically include a stationary sealing ring about the shaft but fixed to the housing, with another sealing ring mounted on and rotating with a rotating shaft. In a magnetic face seal design, the rotating sealing ring typically includes a carbon element and the magnetic sealing ring rubs against the carbon element which results in increased friction, heat and wear.

Figure 1:
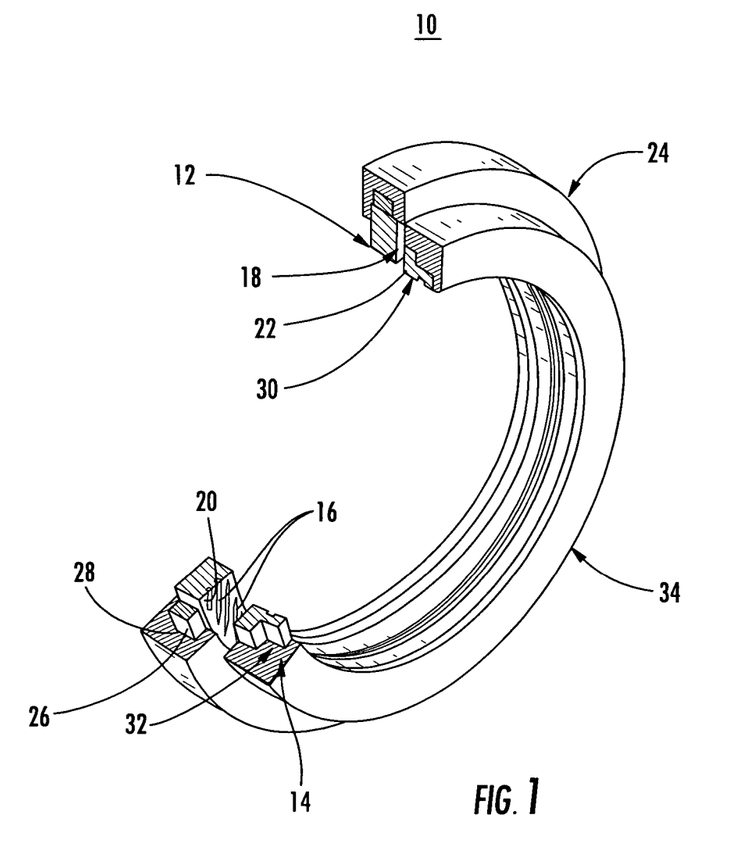
FIG. 1 is a schematic three-dimensional cutaway view of one example of the hydrodynamic magnetic seal in accordance with the present invention.
Figure 2:
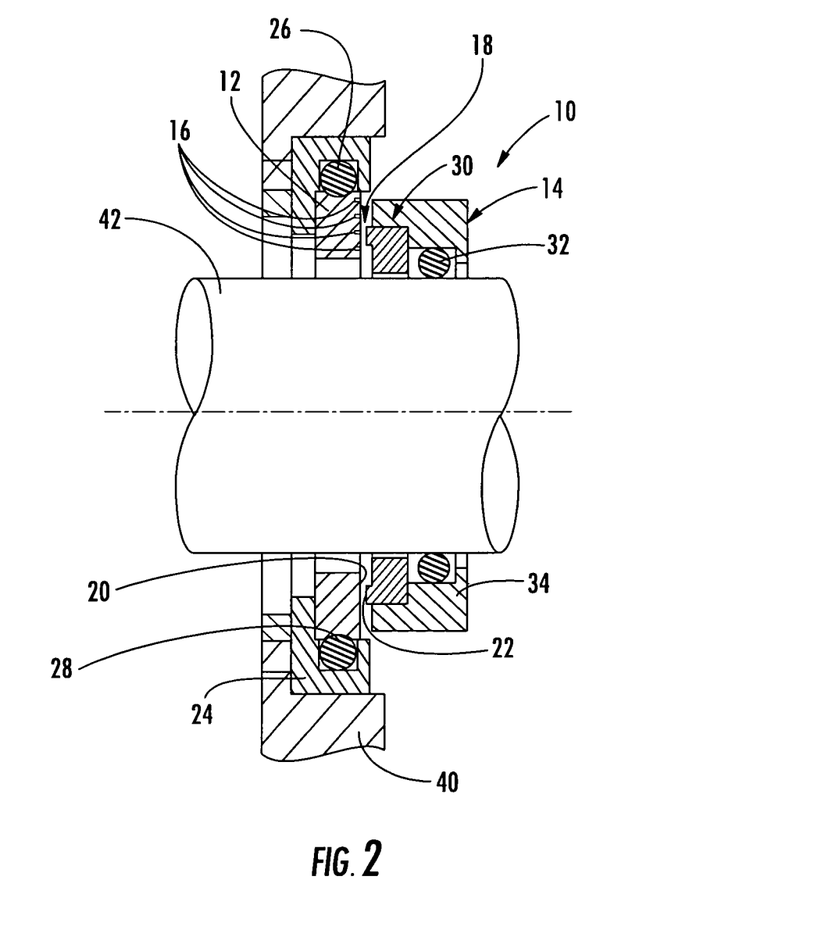
FIG. 2 is a cross-sectional schematic view of the hydrodynamic magnetic seal of FIG. 1.

An example of a hydrodynamic magnetic seal 10 in accordance with the present invention is shown in FIGS. 1 and 2. Hydrodynamic magnetic seal 10 includes two sealing rings, namely, magnetic mating ring 12, and sealing ring 14 which is attracted to magnetic mating ring 12. Preferably, magnetic mating ring 12 includes hydrodynamic grooves 16 in sealing face 20 configured to create a separation film between magnetic mating ring 12 and sealing ring 14 to reduce friction. The magnetic attraction of sealing ring 14 by magnetic mating ring 12 provides the biasing force which urges magnetic mating ring 12 and sealing ring 14 together. Conversely, hydrodynamic grooves 16 create a film of air which separates magnetic mating ring 12 and sealing ring 14 during operation.

Figure 2A:
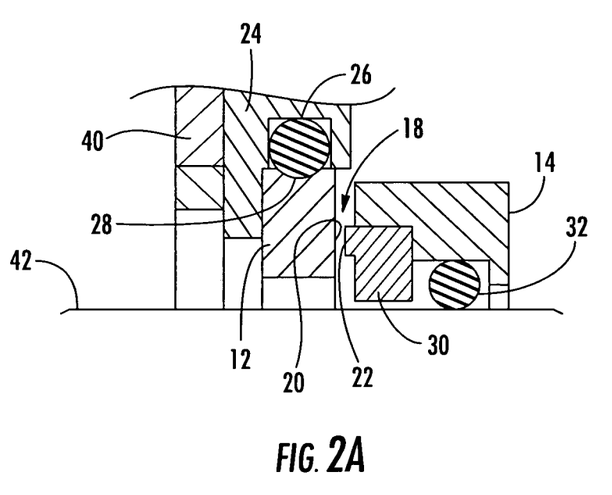
FIG. 2A is an enlarged schematic view of a portion of the hydrodynamic magnetic seal of FIG. 2.

In one preferred embodiment, magnetic mating ring 12, FIGS. 1 and 2 which includes hydrodynamic grooves 16, is stationary while sealing ring 14 rotates about shaft 42. While the present invention is discussed herein in the context of this particular preferred example, the invention is not so limited. In alternative embodiments, the rotating sealing ring may include the hydrodynamic grooves, or the magnetic mating ring may rotate while the sealing ring is stationary. The configuration of hydrodynamic grooves 16 is such that a gas, such as air, is pumped between sealing face 20 of magnetic mating ring 12 and sealing face 22 of sealing ring 14 as the sealing faces 20 and 22 rotate relative to one another. In this way, the relative motion of magnetic mating rings 12 and sealing ring 14 drives the magnetic mating ring 12 and sealing ring 14 apart, offsetting the magnetic attraction. A film is created by air pumped between sealing faces 20 and 22 as a result of grooves 16 providing hydrodynamic pressure and "lift". Depending on the particular placement and orientation and shape of the grooves, air may be pumped inward toward the ID or outward toward the OD, as desired for a particular application. The relationship of sealing faces 20 and 22 is most clearly shown in FIGS. 2 and 2A. Preferably, each of sealing faces 20 and 22 are annular, and in a preferred embodiment, sealing face 20 is stationary while sealing face 22 rotates. Thus, sealing face 22 essentially rides on a film and sealing faces 20 and 22 do not make contact during steady state operation. Friction is thus greatly reduced. In one example, the film of air may have a thickness in the range of between 50 to 200 millionths of an inch.

In one embodiment, hydrodynamic magnetic seal 10, FIG. 1 includes insulator 24 about magnetic mating ring 12, and O-ring 26 between insulator 24 and magnetic mating ring 12. Magnetic mating ring 12 typically includes recess 28 for O-ring 26. Sealing ring 14 may be made of stainless steel of a type attracted by a magnet, such as AISI Type 410 stainless steel having a magnetic permeability of 700-1000, and magnetic mating ring 12 may be made of alnico-5 magnetic material or other magnetic material. Insulator 24 may be made of aluminum alloy. Those skilled in the art will recognize that an insulator is only required when the stationary element of the seal has to be installed in a magnetic material, but is not typically needed for most aerospace applications, for example. These components may be made of other desired materials with similar properties, depending on the particular desired application, although insulator 24 typically must be made of non-magnetic material. When insulator 24 is included, it is preferably stationary and fixed to housing 40, FIG. 2, while sealing ring 14 is a rotary sealing ring and rotates and is fixed to, for example, rotating shaft 42, with magnetic mating ring 12 proximate to and disposed about rotating shaft 42.

In one preferred example, sealing ring 14 includes low friction component 30 defining sealing face 22 thereof. Low friction component 30 reduces friction during times when the relative rotation of magnetic mating ring 12 and sealing ring 14 is not sufficient to create a separation film, such as at startup or shut down of the equipment in which hydrodynamic magnetic seal 10 is utilized. Typically, low friction component 30 is made of carbon, graphite, or a combination of carbon and graphite. O-ring 32 is housed by sealing ring 14, between seal case 34 and shaft 42. Low friction component 30 resides in seal case 34.

Figure 3:
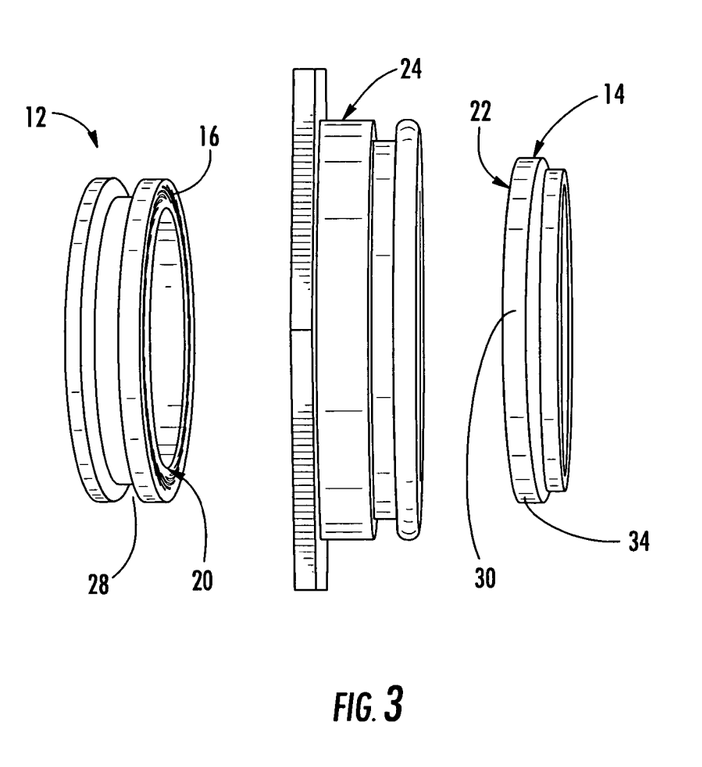
FIG. 3 is an exploded schematic side view of a hydrodynamic magnetic seal in accordance with the present invention.

FIG. 3 shows an exploded view of one example of hydrodynamic magnetic seal in accordance with the present invention. Magnetic mating ring 12 includes hydrodynamic grooves 16 as well as recess 28 for an O-ring to secure magnetic mating ring 12 in insulator 24. Insulator 24, in turn, is fixed to the machinery housing. Sealing ring 14 includes low friction component 30 on seal case 34. As noted, the magnetic attraction of sealing ring 14 by magnetic mating ring 12 provides the biasing force to keep sealing faces 20 and 22 together, while the relative rotation of magnetic mating ring 12 and sealing ring 14 drives them apart and creates a separation film between them to reduce friction.

Figure 4:
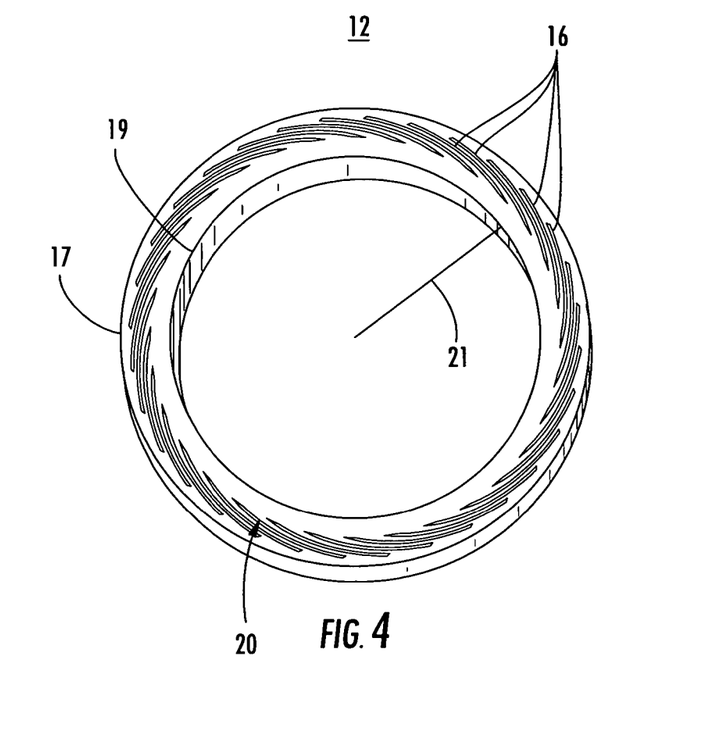
FIG. 4 is a schematic front view of the magnetic mating ring shown in FIG. 3.
Figure 5:
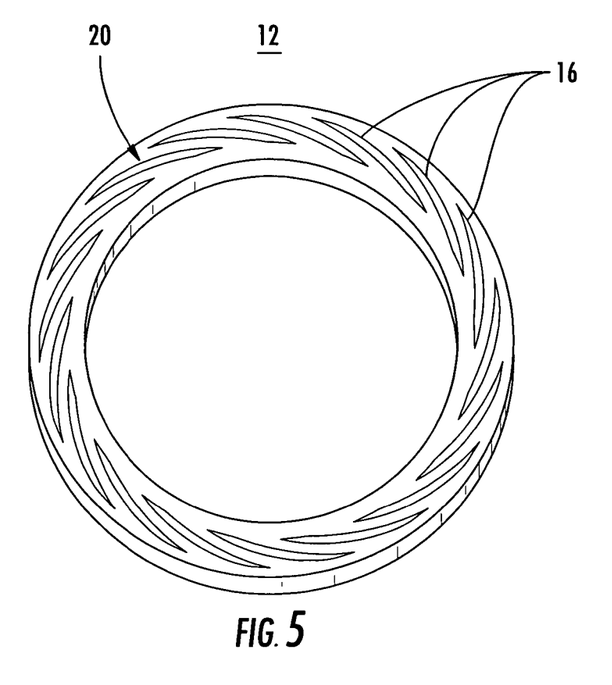
FIG. 5 is a schematic front view of another example of a magnetic mating ring with hydrodynamic grooves in accordance with the present invention.
Figure 6:
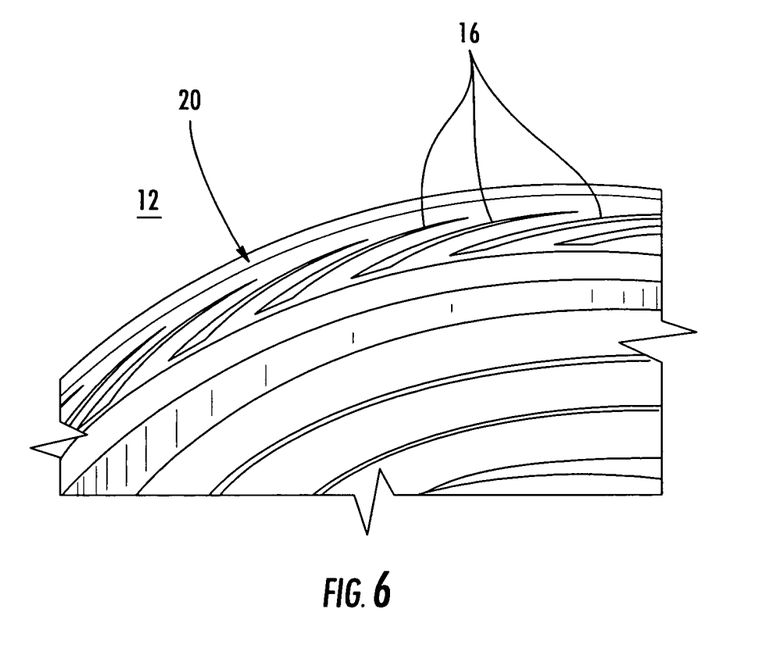
FIG. 6 is a partial schematic side view of the magnetic mating ring shown in FIG. 5.

FIG. 4 is a front view of magnetic mating ring 12 of FIG. 3, more clearly showing sealing face 20 thereof including hydrodynamic grooves 16. Hydrodynamic grooves 16 are angled relative to radius 21 of magnetic mating ring 12 such that when sealing ring 14 (and thus sealing face 20) rotates, the hydrodynamic grooves 16 pump gas between sealing faces 20 and 22, FIG. 3. As shown in FIG. 4, hydrodynamic grooves 16 extend between outer diameter 17 and inner diameter 19 of sealing face 20 and are evenly spaced, although this is not a necessary limitation of the invention. FIG. 5 is a front view of another example of magnetic mating ring 12 in accordance with the present invention, showing sealing face 20 including a lesser number of hydrodynamic grooves 16 with different dimensions and different pitch than the example of FIG. 4, while FIG. 6 shows more clearly the depth of grooves 16 on sealing face 20.

Figure 7A:
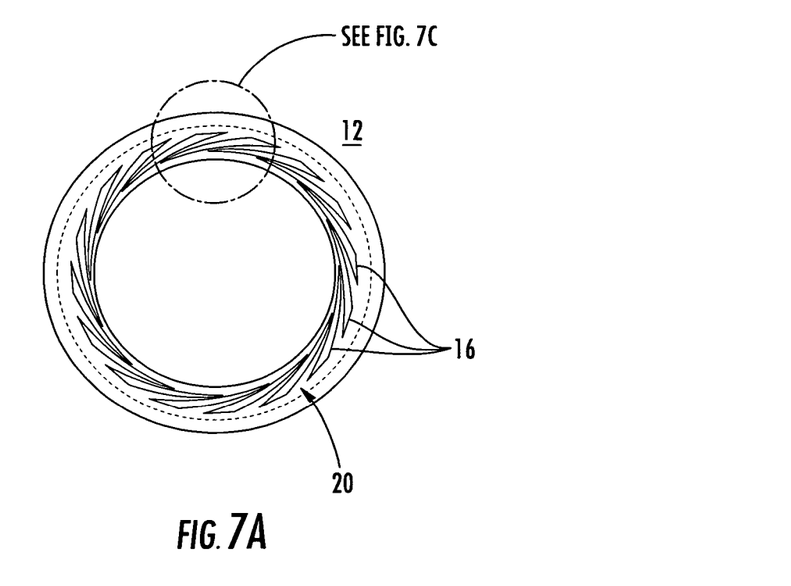
FIG. 7A is a schematic front view of one example of a magnetic mating ring sealing face in accordance with the present invention including hydrodynamic spiral grooves.
Figure 7B:
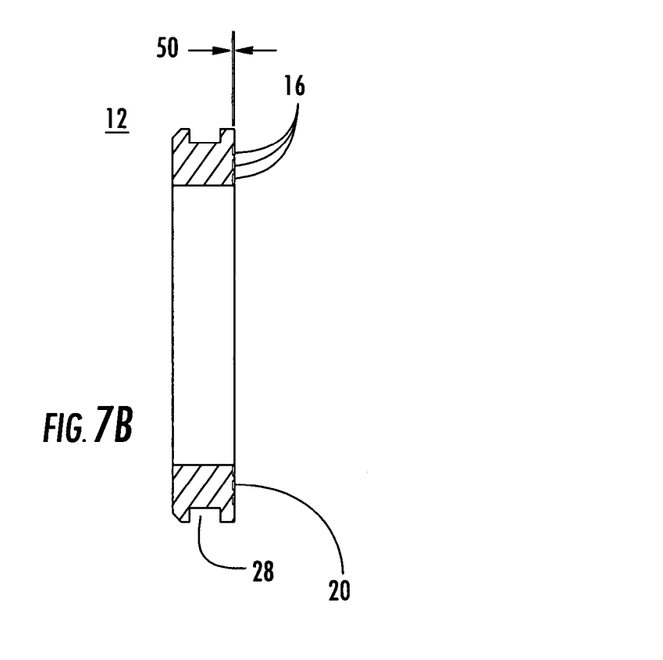
FIG. 7B is a schematic cross-sectional view of the magnetic mating ring of FIG. 7A.
Figure 7C:
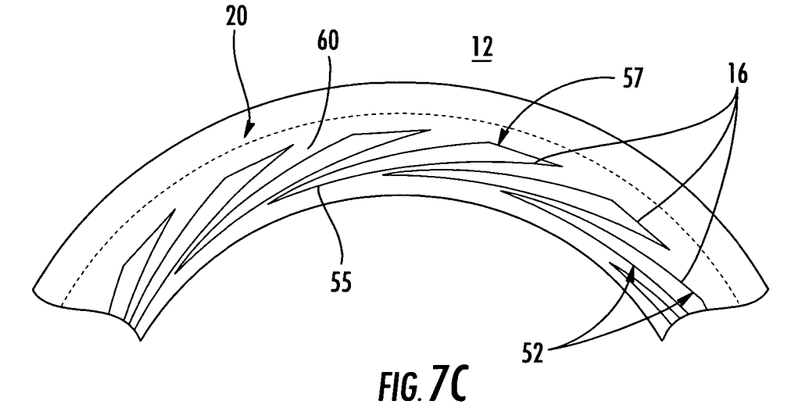
FIG. 7C is an enlarged schematic view of the hydrodynamic grooves shown in FIG. 7A.

Although the design and precise shape and size of the hydrodynamic grooves can vary depending on the desired use of the hydrodynamic seal of the present invention, typical dimensions for hydrodynamic grooves 16 are discussed in connection with FIGS. 7A-7C for one specific application. In this example, hydrodynamic grooves 16 are between 0.00010 inches and 0.00050 inches deep, preferably 0.000151 inches, with spiral radius 52 in the range of between 0.50 inches and 1.000 inches, preferably 0.661 inches. The spiral groove radial width, which is equal to half the distance between the diameter 55 where the grooves start and the diameter 57 where the grooves end, is in the range between 0.050 inches and 0.150 inches, preferably 0.059 inches. With land 60 defined as the area between hydrodynamic grooves 16, in this example the preferred land to groove ratio is in the range between 0.65 and 1.000, preferably 0.74. For other applications the depth, size, shape, angles, termination points, etc. may be varied to suit different operating conditions and, as noted, the foregoing dimensions are not necessary limitations of the present invention. U.S. Pat. Nos. 3,499,653, 5,375,853, and 5,941,532, which are incorporated herein by reference, each include seals having grooves of various depths and shapes.

The present invention thus provides a hydrodynamic magnetic seal with reduced friction and heat, together with increased useful life, which may be utilized wherever face seals may be required, such as in gas turbines, gearboxes, engines, or in aerospace or other industries.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims. For example, it may be the magnetic mating ring and/or the sealing ring which includes the hydrodynamic grooves. Also, either the magnetic mating ring or the sealing ring may be stationary or rotating.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A hydrodynamic magnetic seal comprising:
   a magnetic mating ring; and
   a sealing ring attracted to the magnetic mating ring, the magnetic attraction between the sealing ring and the magnetic mating ring providing the biasing force that urges the magnetic ring and the sealing ring together;
   the magnetic mating ring and/or the sealing ring including hydrodynamic grooves configured to create a separation film of air or gas between the magnetic mating ring and the sealing ring to reduce friction.

2. The hydrodynamic magnetic seal of claim 1 in which the magnetic mating ring is stationary and the sealing ring rotates.

3. The hydrodynamic magnetic seal of claim 1 in which the magnetic mating ring includes an annular sealing face and the hydrodynamic grooves are in said sealing face.

4. The hydrodynamic magnetic seal of claim 3 in which the hydrodynamic grooves are configured to pump the gas between sealing faces of the magnetic mating ring and the sealing ring.

5. The hydrodynamic magnetic seal of claim 1 in which the film is between 50 to 200 millionths of an inch thick.

6. The hydrodynamic magnetic seal of claim 2 further including an insulator about the magnetic mating ring.

7. The hydrodynamic magnetic seal of claim 6 in which the insulator is made of aluminum alloy.

8. The hydrodynamic magnetic seal of claim 7 further including an O-ring disposed between the insulator and the magnetic mating ring.

9. The hydrodynamic magnetic seal of claim 8 in which the sealing ring is made of stainless steel of a type attracted by a magnet.

10. The hydrodynamic magnetic seal of claim 9 in which the magnetic mating ring is made of alnico-5 magnetic material.

11. The hydrodynamic magnetic seal of claim 1 in which the sealing ring includes a low friction component defining a sealing face thereof.

12. The hydrodynamic magnetic seal of claim 11 in which the low friction component is made of carbon, graphite, or a combination of carbon and graphite.

13. The hydrodynamic magnetic seal of claim 1 further including an O-ring housed by the sealing ring.

14. The hydrodynamic magnetic seal of claim 1 in which the hydrodynamic grooves have a depth in the range between 0.00010 inches and 0.00050 inches.

15. The hydrodynamic magnetic seal of claim 14 in which the hydrodynamic grooves have a spiral radius in the range between 0.50 inches and 1.000 inches.

16. The hydrodynamic magnetic seal of claim 15 in which the hydrodynamic grooves have a radial width in the range between 0.050 inches and 0.150 inches.

17. The hydrodynamic magnetic seal of claim 16 in which the hydrodynamic grooves have a land to groove ratio in the range between 0.65 and 1.00.

18. The hydrodynamic magnetic seal of claim 1 in which the magnetic mating ring includes spiral grooves.

19. A hydrodynamic magnetic seal comprising:
a stationary magnetic ring including an annular sealing face; and
a rotary sealing ring also including an annular sealing face attracted to the magnetic mating ring, the magnetic attraction between the sealing ring and the magnetic mating ring providing the biasing force that urges the magnetic ring and the sealing ring together;
the sealing face of the stationary magnetic ring including hydrodynamic grooves configured to pump gas between the two sealing faces and create a separation film of air or gas therebetween to reduce friction.

20. The hydrodynamic magnetic seal of claim 19 in which the film is between 50 to 200 millionths of an inch thick.

21. The hydrodynamic magnetic seal of claim 19 further including an insulator about the stationary magnetic ring.

22. The hydrodynamic magnetic seal of claim 21 in which the insulator is made of aluminum alloy.

23. The hydrodynamic magnetic seal of claim 22 further including an O-ring disposed between the insulator and the stationary magnetic ring.

24. The hydrodynamic magnetic seal of claim 23 in which the rotary sealing ring is made of stainless steel of a type attracted by a magnet.

25. The hydrodynamic magnetic seal of claim 24 in which the magnetic mating ring is made of alnico-5 magnetic material.

26. The hydrodynamic magnetic seal of claim 19 in which the rotary sealing ring includes a low friction component defining a sealing face thereof.

27. The hydrodynamic magnetic seal of claim 26 in which the low friction component is made of carbon, graphite, or a combination of carbon and graphite.

28. The hydrodynamic magnetic seal of claim 19 further including an O-ring housed by the rotary sealing ring.

29. The hydrodynamic magnetic seal of claim 19 in which the hydrodynamic grooves have a depth in the range between 0.00010 inches and 0.00050 inches.

30. The hydrodynamic magnetic seal of claim 29 in which the hydrodynamic grooves have a spiral radius in the range between 0.50 inches and 1.00 inches.

31. The hydrodynamic magnetic seal of claim 30 in which the hydrodynamic grooves have a radial width in the range between 0.050 inches and 0.150 inches.

32. The hydrodynamic magnetic seal of claim 31 in which the hydrodynamic grooves have a land to groove ratio in the range between 0.65 and 1.0.

33. A hydrodynamic magnetic seal comprising:
a stationary magnetic mating ring fixed within a stationary insulator; and
a rotary sealing ring fixed to a rotating shaft proximate the stationary magnetic mating ring and attracted to the magnetic mating ring, the magnetic attraction between the sealing ring and the magnetic mating ring providing the biasing force that urges the magnetic ring and the sealing ring together, the rotary sealing ring including a carbon component;
the magnetic mating ring and/or the sealing ring including hydrodynamic grooves configured to drive the stationary magnetic mating ring and the rotary sealing ring apart and create a separation film of air or gas therebetween during operation to offset magnetic attraction to reduce friction.

34. A hydrodynamic magnetic seal comprising:
a stationary magnetic mating ring including an annular sealing face;
an insulator about the stationary magnetic mating ring; and
a rotary sealing ring attracted to the magnetic mating ring, the magnetic attraction between the rotary sealing ring and the stationary magnetic mating ring providing the biasing force that urges the rotary sealing ring and the stationary magnetic mating ring together, the rotary sealing ring also having an annular sealing face including a carbon element;
the annular sealing face of the magnetic mating ring and/or the rotating sealing ring including hydrodynamic grooves configured to drive the stationary magnetic mating ring and the rotary sealing ring apart and pump a gas between the sealing faces and create a separation film of air or gas therebetween during operation to offset magnetic attraction to reduce friction.

35. A hydrodynamic magnetic seal comprising:
a stationary magnetic mating ring with hydrodynamic grooves about a shaft; and
an unloaded rotary sealing ring slidable on the shaft and made of a material attracted to the stationary magnetic sealing ring so the sealing ring seals against the stationary magnetic ring when the shaft is not rotating;
the hydrodynamic grooves configured to create a separation film of air or gas which separates the sealing ring from the stationary magnetic sealing ring when the shaft rotates.

* * * * *